(12) United States Patent
Sakaida et al.

(10) Patent No.: US 6,771,823 B2
(45) Date of Patent: Aug. 3, 2004

(54) CODING AND DECODING OF MOVING PICTURES BASED ON SPRITE CODING

(75) Inventors: Shinichi Sakaida, Tokyo (JP); Hiroyuki Imaizumi, Tokyo (JP); Yoshiaki Shishikui, Tokyo (JP); Yasuaki Kanatsugu, Tokyo (JP); Wentao Zheng, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 680 days.

(21) Appl. No.: 09/811,923

(22) Filed: Mar. 19, 2001

(65) Prior Publication Data

US 2001/0036319 A1 Nov. 1, 2001

(30) Foreign Application Priority Data

Mar. 21, 2000 (JP) .......................... 2000-078131
Jul. 5, 2000 (JP) .......................... 2000-203335

(51) Int. Cl.$^7$ .............................................. G06K 9/36
(52) U.S. Cl. ...................................................... 382/232
(58) Field of Search ................................ 382/232, 236; 348/387.1, 386.1, 382.1, 390.1, 394.1, 395.1, 400.1–404.1, 407.1–416.1, 430.1–431.1; 375/240–240.1, 240.03, 240.12–240.16, 240.18, 240.2–240.25

(56) References Cited

U.S. PATENT DOCUMENTS

| | | | | |
|---|---|---|---|---|
| 5,764,803 A | * | 6/1998 | Jacquin et al. | 382/236 |
| 5,913,082 A | * | 6/1999 | Onoda | 396/128 |
| 6,157,747 A | * | 12/2000 | Szeliski et al. | 382/284 |
| 6,173,087 B1 | * | 1/2001 | Kumar et al. | 382/284 |
| 6,266,100 B1 | * | 7/2001 | Gloudemans et al. | 348/587 |
| 6,556,704 B1 | * | 4/2003 | Chen | 382/154 |
| 6,686,970 B1 | * | 2/2004 | Windle | 348/584 |

OTHER PUBLICATIONS

S. Shimoda, M. Hayashi, Y. Kanatsugu, "New Chroma–key Imaging Technique with Hi–Vision Background," IEEE Trans. Broadcasting, vol. 35, No. 4, pp 357–361, Dec. 1989.
S. Hayashi, S. Shimoda, Y. Kanatsugu, "Defocus Equipment Using FIR Digital Filter With Recursive Network," Technical Report of IEICE, IE88–10, pp. 69–75, 1988.
K. Jinzenji, S. Ishibashi, N. Kobayashi, "Automatic Sprite Producing Method by Means of Camera Motion Detection," Trans. of the IEICE, D–II, vol. J82–D–II, No. 6, pp. 1018–1030, 1999.
M. Irani, S. Hsu, P. Anandan, "Video Compression Using Mosaic Representations," Signal Processing: Image Communication 7, pp. 529–552, 1995.
Ming–Chieh Lee, et al., "A Layered Video Object Coding System Using Sprite and Affine Motion Model," IEEE Trans. CAS For Video Technology, vol. 7, No. 1, pp. 130–145, Feb., 1997.

(List continued on next page.)

Primary Examiner—Jose L. Couso
(74) Attorney, Agent, or Firm—Ladas & Parry

(57) ABSTRACT

A method of coding and transmitting moving pictures includes the steps of coding an extended background image, coding parameters indicative of an image area within the extended background image, coding a foreground picture that is to be composed with a background picture corresponding to the image area indicated by the parameters, coding a defocus value indicative of an extent to which the background picture should blur, and transmitting the coded extended background image, the coded parameters, the coded foreground picture, and the coded defocus value as a data stream to a decoder side. Coding and transmitting of the defocus value makes it possible to defocus the background picture at the decoder end, thereby producing a composed image of the background picture and the foreground picture having natural appearance.

15 Claims, 14 Drawing Sheets

OTHER PUBLICATIONS

M. Irani, et al., "Efficient Representations of Video Sequences and Their Applications," Signal Processing: Image Communication 8, pp. 327–351, 1996.

A. Smoliae, T. Sikora, J.R. Ohm, "Long–Term Global Motion Estimation and Its Application for Sprite Coding, Content Description, and Segmentation," IEEE Trans. on CAS For Video Technology, vol. 9, No. 8, pp. 1227–1242, Dec. 1999.

M. Kourogi, J. Hoshino, Y. Muraoka, "Real–Time Panoramic Image Mosaicing from a Video Sequence," Technical Report of IEICE, PRMU98–185, pp. 67–74, 1999.

N. Chiba, "Panoramic Image Synthesis Based on Image Mosaicing," Image Lab., pp. 17–20, Feb. 1999.

T. Wada, N. Ukita, T. Matsuyama, "Fixed Viewpoint Pan–Tilt–Zoom Camera and Its Applications," Trans. of the IEICE, D–II, vol. J81–D–II, No. 6, pp. 1182–1193, 1998.

J. Hoshino, I. Masuda, "Panorama Image Mosaicing Based on the Camera Positioning Information," Trans. of the Institute of Image Electronics, vol. 28, No. 3, pp. 247–255, 1999.

N. Asada, M. Baba, "Calibarated Computer Graphics," Image Lab., pp. 10–14, 1999.

Y. Kanazawa, K. Kanatana, "Stabilizing Image Mosaicing by the Geometric AIC," Computer Vision and Image Media 117–5, pp. 31–38, 1999.

N. Yokoya, "Virtualizing Outdoor Dynamic Real Environments Using Omnidirectional Video Cameras," Computer Vision and Image Media, 119–15, pp. 109–119, 1999.

Y. Tonomura, Y. Taniguchi, A. Akutsu, "Paper Video: Paper–based New Video Interfaces," Technical Report of IEICE, IE94–59, pp. 15–20, 1994.

T. Echigo, et al., "Video Mosaic from segmented Regions," Symposium on Image Recognition and Understanding (MRU '98), pp. I–177–I–122, 1998.

* cited by examiner

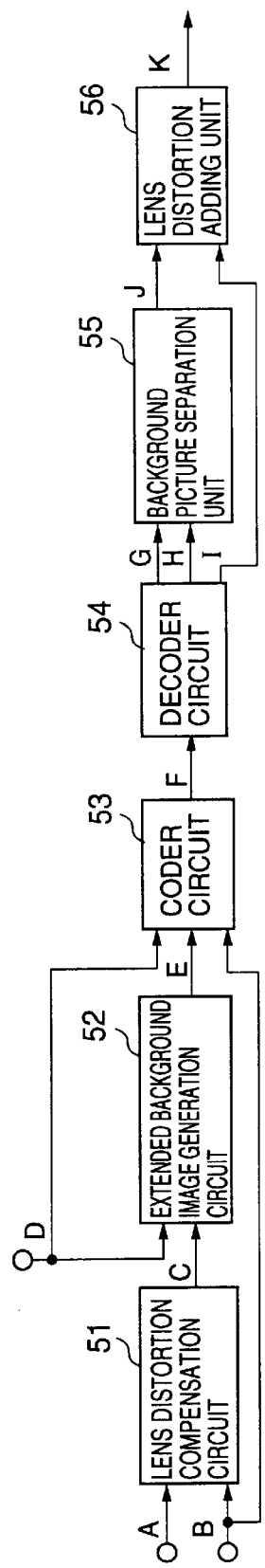

FIG.13

| FOCUS | ZOOM | FOCAL LENGTH | OPTICAL CENTER POSITION | 1st ORDER DISTORTION COEFFICIENTS κ1 | 2nd ORDER DISTORTION COEFFICIENTS κ2 | IMAGE CENTER COORDINATE x [PIX] | IMAGE CENTER COORDINATE y [PIX] |
|---|---|---|---|---|---|---|---|
| 0.00 | 0.00 | 10.437700 | -142.790000 | 0.00137541 | 1.91443e-05 | 313.824700 | 250.990909 |
| 0.00 | 0.10 | 12.603300 | -119.562000 | 0.000402115 | 1.62291e-06 | 313.917700 | 250.901455 |
| 0.00 | 0.20 | 15.152600 | -103.642000 | -0.000302402 | -3.81653e-06 | 314.917700 | 250.967182 |
| 0.00 | 0.30 | 18.520200 | -104.886000 | -0.000736635 | -3.61167e-07 | 314.303500 | 250.958091 |
| 0.00 | 0.40 | 23.365600 | -100.775000 | -0.000858424 | 2.47645e-06 | 314.176100 | 250.953455 |
| 0.00 | 0.50 | 30.508500 | -95.419700 | -0.000671258 | -1.93425e-06 | 314.038700 | 250.931727 |
| 0.00 | 0.60 | 40.763000 | -77.241700 | -0.000429352 | -6.42463e-06 | 314.006700 | 250.958727 |
| 0.00 | 0.70 | 54.832500 | -55.727100 | -0.000143913 | -1.49598e-05 | 314.039900 | 250.957364 |
| 0.00 | 0.80 | 74.094800 | -26.712100 | -0.000142604 | -1.50196e-05 | 314.055500 | 250.960182 |
| 0.00 | 0.90 | 100.246000 | -5.060830 | -0.000142604 | -1.50196e-05 | 314.105100 | 250.926091 |
| 0.00 | 1.00 | 135.481000 | 48.176300 | -0.000142604 | -1.50196e-05 | 314.095700 | 250.954545 |
| 0.10 | 0.00 | 10.368300 | -142.086000 | 0.00144755 | 1.81703e-05 | 317.275600 | 250.432091 |
| 0.10 | 0.10 | 12.553500 | -121.502000 | 0.000402658 | 1.74242e-06 | 317.439800 | 250.370273 |
| 0.10 | 0.20 | 15.109500 | -104.666000 | -0.000307083 | -4.1137e-06 | 317.764600 | 250.416545 |
| 0.10 | 0.30 | 18.488000 | -105.555000 | -0.000749651 | -6.1776e-07 | 317.772000 | 250.408364 |
| 0.10 | 0.40 | 23.359000 | -102.005000 | -0.000879515 | 2.308340e-06 | 317.671400 | 250.403455 |
| 0.10 | 0.50 | 30.552300 | -96.671000 | -0.000685855 | -2.44441e-06 | 317.550900 | 250.391909 |
| 0.10 | 0.60 | 40.942200 | -77.803400 | -0.000471645 | -5.90212e-06 | 317.523600 | 250.403545 |
| 0.10 | 0.70 | 55.260400 | -55.668400 | -0.000195378 | -1.55518e-05 | 317.555200 | 250.406545 |
| 0.10 | 0.80 | 74.950400 | -27.025600 | -0.000192501 | -1.56339e-05 | 317.571600 | 250.406000 |
| 0.10 | 0.90 | 102.071000 | -2.438690 | -0.000192501 | -1.56339e-05 | 317.605100 | 250.383000 |
| 0.10 | 1.00 | 139.234000 | 56.349600 | -0.000192501 | -1.56339e-05 | 317.640800 | 250.385182 |

CODING AND DECODING OF MOVING PICTURES BASED ON SPRITE CODING

BACKGROUND OF THE INVENTION

1. Field of the Invention

The present invention generally relates to a method which encode and decode moving pictures, and particularly relates to a method which efficiently encode and decode foreground images and background images separately provided for moving pictures. Further, the present invention relates to a decoder and encoder based on this method.

2. Description of the Related Art

Technologies for coding images into digital data for the purpose of data transmission and data storage have been employed in digital broadcasting and digital videotape recording. MPEG-4 is a next standard following MPEG-2 that is widely used today, and employs object-based coding that encodes foreground pictures and background pictures separately after they are separated from the original images. The object-based coding has advantages such as the improvement of coding efficiency based on separation of foreground images from the background images. In particular, MPEG-4 includes a scheme that is called a "sprite coding".

"Sprite" is an extended, panoramic image used for background pictures. This extended image is coded and transmitted in advance. On the receiver side, an image patch is extracted from the extended image at proper locations so as to be used as a background picture of the decoded image. In this sprite scheme, all that needs to be coded is the extended background image and position parameters used for image extraction at the receiver end. This eliminates a need to encode every frame, thereby making it possible to improve image coding efficiency.

When the brightness level is uniformly changed for the entirety of the background, parameters representing such a change are coded, and the background image is modified on the receiver side according to these parameters. If the background image shows a change other than a uniform brightness-level change, a picture that corresponds to the point of change is coded again so as to update the background image.

In production of broadcast programs, there has been used a method that synthesizes foreground pictures with background pictures to produce composed images. Nowadays, virtual studio techniques are widely used that utilizes computer graphics for background images. One of the methods for producing synthesized images having natural appearance is defocusing. When a foreground picture and a background picture are both in focus, a composed image lacks natural appearance. With defocusing of the background picture, however, a sense of distance and depth are increased, thereby making images appear more natural. Such a method is employed in various types of image synthesizing apparatuses.

In the related-art scheme that encodes foregrounds and backgrounds separately, if the background image of moving pictures blurs, the extended background image is encoded and transmitted again to cope with the blurring. This method, however, is undesirably inefficient since the extended background image needs to be coded each time there is a change.

Accordingly, there is a need for a scheme that encodes only a minimum amount of data when coping with blurring of background pictures.

Moreover, there is another drawback in the related art as will be described in the following.

A sprite (i.e., the extended background image) is generated by putting together a plurality of background pictures through application of image processing called panorama image processing or image mosaic processing. In such processing, camera parameters regarding camera panning and zooming or the like are estimated from video signals or directly obtained from the camera position sensors with an aim of determining relative positions of images for the purpose of integrating them together.

When images are to be integrated together, geometric distortions of the camera lens needs to be compensated for and removed from the images before the integrating thereof. Such lens distortions can be represented by formula based on a model that employs several parameters.

When a portion of the extended background image is extracted at the decoder end to produce moving pictures, no consideration is given to the fact that the extended background image is lacking in lens distortion. If lens distortion is not added back to extracted background pictures, original moving pictures cannot be reconstructed at the decoder end precisely as they were at the coder end, since lens distortion has been removed out of consideration for precision of image integration.

Accordingly, when the background picture having the lens distortion thereof removed is composed with a foreground picture having the lens distortion, a reconstructed image may not produce natural appearance because of disparity between the presence and absence of the lens distortion.

Accordingly, there is a need for a scheme that suppresses unrealistic appearance of reconstructed images caused by disparity between the presence and absence of lens distortion.

SUMMARY OF THE INVENTION

It is a general object of the present invention to provide a coding and decoding scheme that substantially obviates one or more of the problems caused by the limitations and disadvantages of the related art.

It is another and more specific object of the present invention to provide a coding and decoding scheme that encodes only a minimum amount of data when coping with blurring of background pictures.

It is yet another object of the present invention to provide a coding and decoding scheme that suppresses unrealistic appearance of reconstructed images caused by disparity between the presence and absence of lens distortion.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a coding and decoding scheme particularly pointed out in the specification in such full, clear, concise, and exact terms as to enable a person having ordinary skill in the art to practice the invention.

To achieve these and other advantages and in accordance with the purpose of the invention, as embodied and broadly described herein, a method of coding and decoding moving pictures according to the present invention includes the steps of coding an extended background image and a foreground picture separately from each other, coding parameters indicative of an image area within the extended background image, coding a defocus value, decoding the extended background image and the foreground picture, decoding the parameters, decoding the defocus value, extracting a background picture from the image area indicated by the decoded parameters within the decoded extended background image, blurring the background picture to an extent indicated by the decoded defocus value, and composing the blurred background picture with the decoded foreground picture.

According to the method as described above, the defocus value is coded and transmitted from the coder end, and is decoded and used to defocus the background picture at the decoder end. This makes it possible to produce a composed image of the background picture and the foreground picture having natural appearance, and all that is necessary to achieve this is to encode and transmit the defocus value, which is a minimum amount of data necessary for the focus control purpose.

According to another aspect of the present invention, a method of coding and decoding moving pictures includes the steps of coding an extended background image and a foreground picture separately from each other, coding parameters indicative of an image area within the extended background image, coding a lens distortion value, decoding the extended background image and the foreground picture, decoding the parameters, decoding the lens distortion value, extracting a background picture from the image area indicated by the decoded parameters within the decoded extended background image, distorting the background picture to an extent indicated by the decoded distortion value, and composing the distorted background picture with the decoded foreground picture.

In the method as described above, the distortion value that represents the amount of lens distortion is coded and transmitted from the coder end, and is decoded and used to distort the background picture at the decoder end. This makes it possible to produce a composed image of the background picture and the foreground picture having substantially the same amount of lens distortion, thereby suppressing unrealistic appearance in the reconstructed image.

BRIEF DESCRIPTION OF THE DRAWINGS

FIG. 10 is a block diagram showing a decoder and encoder apparatus according a second embodiment of the present invention;

FIG. 13 shows an example of a table that specifies lens distortion in relation to camera position sensor.

DESCRIPTION OF THE PREFERRED EMBODIMENTS

In the following, embodiments of the present invention will be described with reference to the accompanying drawings.

It should be noted that the present invention adds new functions to the latest version of MPEG-4, i.e., ISO/IEC 14496-2:1999/AMD1:2000, published on Jul. 15, 2000, the entire contents of which are hereby incorporated by reference. The new functions proposed and described in this application have been adopted by the committee, and is added to a new version of MPEG-4, which will be made public as ISO/IEC 14496-2:2001/AMD1.

Figure 1:
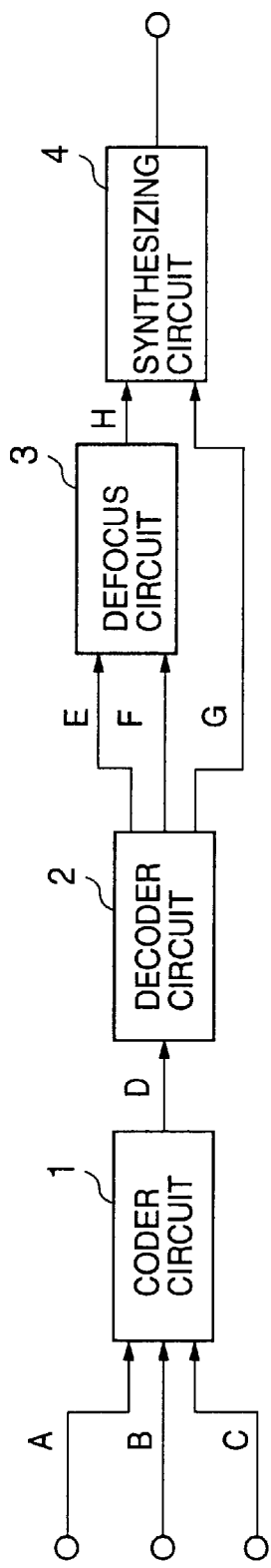
FIG. 1 is a block diagram showing a decoder and encoder apparatus according a first embodiment of the present invention.

FIG. 1 is a block diagram showing a decoder and encoder apparatus according a first embodiment of the present invention.

A coder circuit 1 receives, at an input A, an extended panoramic image used as background pictures of a video and parameters for extracting a background picture from the extended background image. Further, the coder circuit 1 receives a defocus value at an input B where the defocus value defines the extent to which the extracted background picture is to be blurred. Moreover, the coder circuit 1 receives one or more foreground pictures of the video. The coder circuit 1 encodes the extended background image, the parameters, the defocus value, and the foreground pictures to produce digital data D, which is then transmitted to a decoder circuit 2.

The decoder circuit 2 decodes the digital data D that has been coded and transmitted thereto. The decoder circuit 2 outputs a signal representing a decoded background picture at an output E, a signal representing a decoded defocus value at an output F, and a signal representing a decoded foreground picture at an output G.

A defocus circuit 3 applies defocusing processing to the signal representing the decoded background picture (at E) where the level of defocusing is dependent on the decoded defocus value (at F). Details of the defocus processing will be described later.

The defocus circuit 3 outputs a signal representing the defocused background picture at an output H. A synthesizing circuit 4 synthesizes the signal representing the defocused background picture (at H) with the signal representing the decoded foreground picture (at G).

Figure 2:
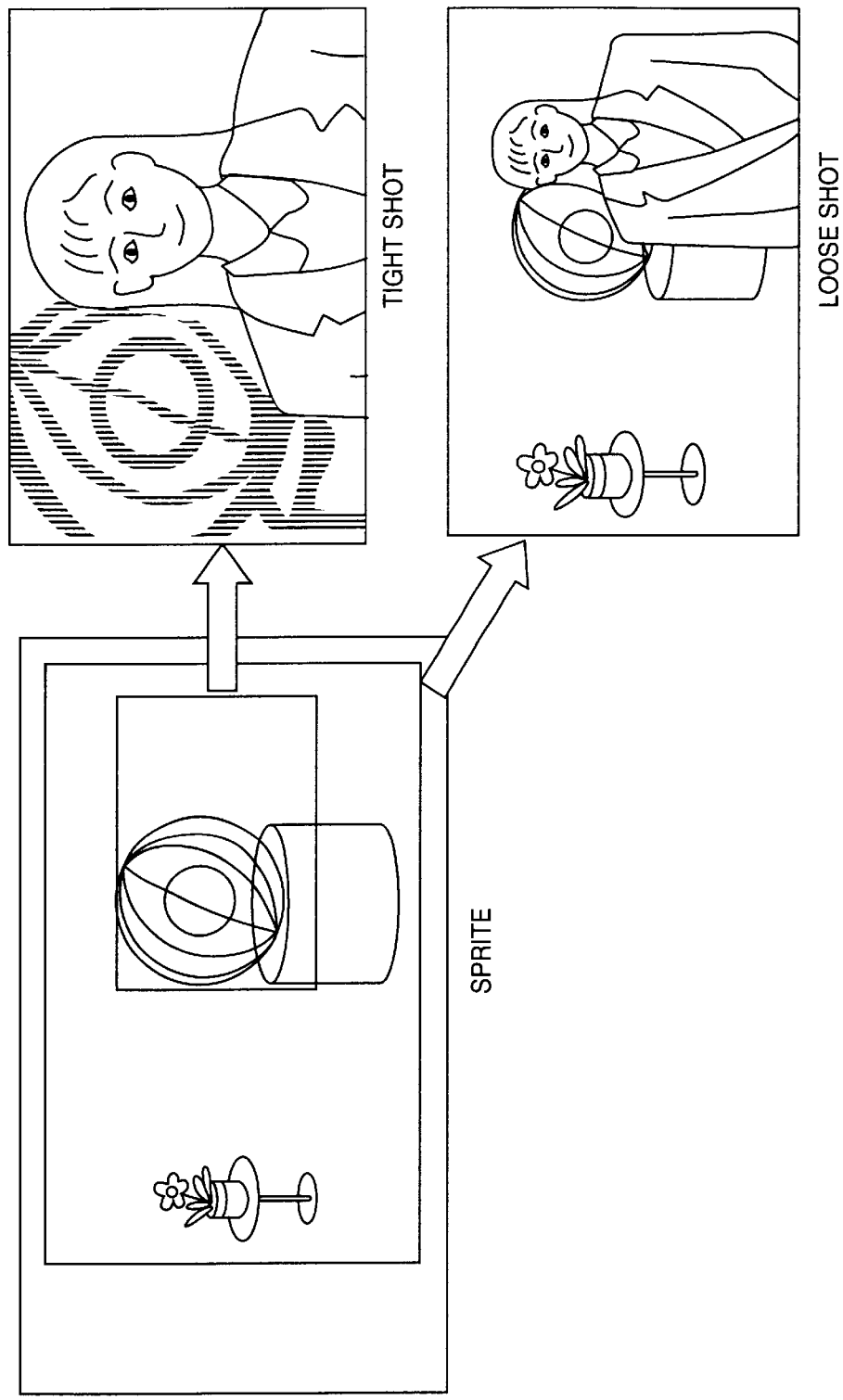
FIG. 2 is an illustrative drawing showing an example of an extended background image and use of a partial image thereof as a background picture that is composed with a foreground picture.

FIG. 2 is an illustrative drawing showing an example of an extended background image and use of a partial image thereof as a background picture that is composed with a foreground picture.

On the left-hand side of FIG. 2, an extended background image (i.e., sprite) is shown, and illustrates a panoramic view of the studio, from which a news program or the like is broadcast, for example. On the right-hand side of FIG. 2 are shown two pictures. The upper picture illustrates a tight shot in which a foreground picture of a lady is composed with a background picture, which is extracted from the extended background image as marked by a smaller open rectangle. The lower picture illustrates a loose shot in which the picture of the lady is composed with a background picture extracted as demarcated by a large open rectangle. The position and size of these rectangles are indicated by the parameters for image extraction, which are coded each time an image frame is transmitted. These parameters may include coordinates of four corners of the image area to be extracted.

In the tight shot image, the background is properly defocused, providing realistic appearance and perception of appropriate depth. In the loose shot, the background picture is not as blurred as in the tight shot. Adjustment of focusing of the background picture is properly controlled by use of the defocus value in the present invention.

In the above example, the defocus value is used as a controlling factor to defocus the background picture. Alternatively, the encoder side may encode and transmit camera parameters used at the time of video recording and range data indicative of distance from the camera to the background objects. Here, the camera parameters used for this purpose may include a zoom value, a foreground focus value, and an iris value among other parameters. In such a configuration, the signal appearing at the output F of the decoder circuit 2 represents the decoded camera parameters and the decoded range data. In this case, a defocus value is computed from the depth of field that varies with the camera's focal length and the zoom signal in accordance with the distance of background objects, and the defocusing processing is performed accordingly.

Figure 3:
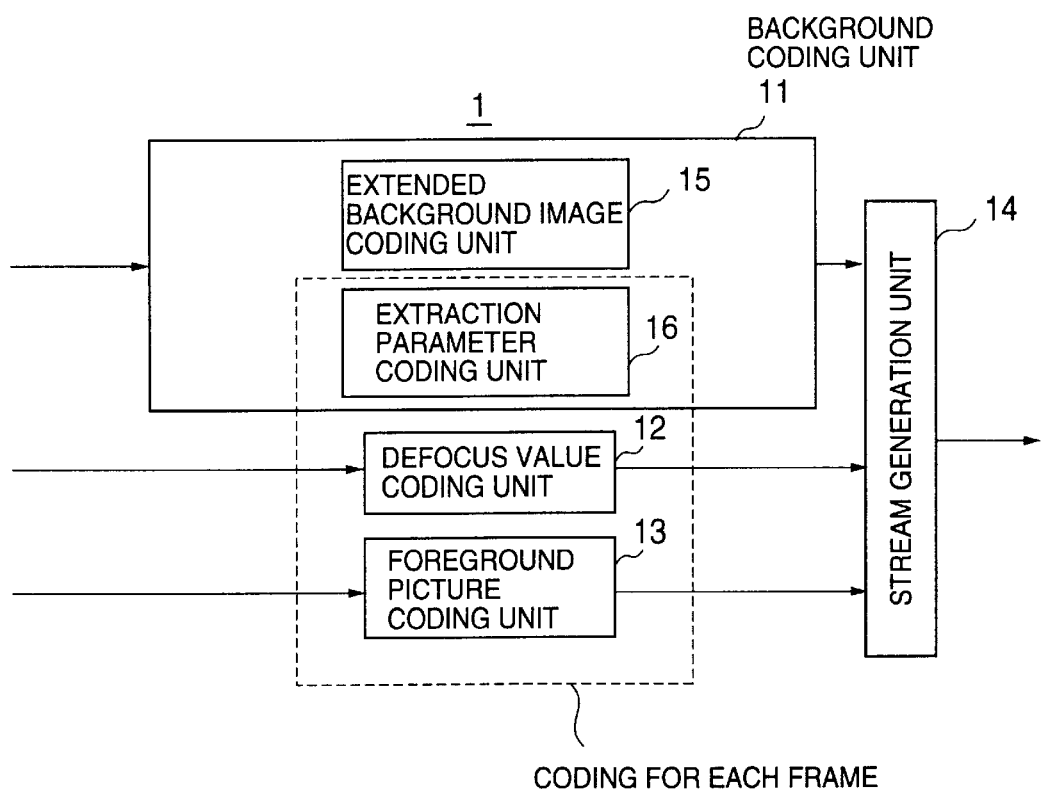
FIG. 3 is a block diagram of a coder circuit according to the first embodiment of the present invention.

FIG. 3 is a block diagram of the coder circuit 1 according to the first embodiment of the present invention.

The coder circuit 1 of FIG. 3 includes a background coding unit 11, a defocus value coding unit 12, a foreground picture coding unit 13, and a stream generation unit 14. The background coding unit 11 includes an extended background image coding unit 15 and an extraction parameter coding unit 16.

The background coding unit 11 encodes background related information. To be specific, the extended background image coding unit 15 of the background coding unit 11 encodes an extended panoramic image for background pictures, and supplies the coded extended background image to the stream generation unit 14. The extended background image coding unit 15 is an encoder that operates based on the intra-coding scheme defined in MPEG-4, and is well within the skill of a person having ordinary skill in the art.

Coding of the extended background image is attended only once prior to coding and transmitting of foreground pictures. Once the extended background image is coded and transmitted, the receiver side (decoder side) can extract an image patch from the decoded extended background image to use it as the background picture of the video. To this end, parameters for extraction of the image patch are coded by the extraction parameter coding unit 16, and are supplied to the stream generation unit 14 after coding.

Coding of the extraction parameters by the extraction parameter coding unit 16 is defined in MPEG-4.

The defocus value coding unit 12 encodes the defocus value, and supplies the corresponding codes to the stream generation unit 14. Determination of a proper defocus value should be made with respect to each image frame. For example, the extent of image blurring may be automatically detected from the video images taken by a video camera, and is translated into a defocus value that should be transmitted to the receiver end. The extent of image blurring may be computed by comparing the actually taken video image with the corresponding portion of the extended background image taken in advance. Alternatively, the defocus value may be computed based on the range data of background objects and the camera parameters used at the time of video recoding. Here, such range data may be obtained by use of a range finder. Many types of range finders have been proposed based on various operating principles, and some are used in practical applications. Alternatively, the range data may be obtained by simply measuring distances of background objects from the camera by use of scales or any means if such measurements are easy to be taken in such environment as in the indoor studios.

As an example, the defocus amount "r" may be obtained as $$r = (f^2/2F) - ((1-a/c)/(a-f)), \quad (1)$$

where "f" is a focal length of the zoom lens, and "F" is an F value of a lens, with "a" denoting the distance from the lens to the foreground object in focus, and "c" denoting the distance from the lens to the background object out of focus. The defocus amount "r" in this case is the radius of a circle of confusion, which represents how large a single point on the background object appears as a blurred circle on the focal plane. The defocus value used in the present invention may be obtained as a parameter proportional to the defocus amount "r" by converting the unit of measurement from the size of an actual camera system to the size of scanning lines, for example.

The defocus value is a single numeric value, and, thus, is simply encoded into a plurality of bits, e.g., 9–12 bits, which may be transmitted without any data compression.

The foreground picture coding unit 13 encodes one or more foreground pictures, which are to be composed with the background pictures at the receiver end. The foreground pictures are coded as defined by MPEG-4 The encoded foreground pictures are supplied to the stream generation unit 14.

The stream generation unit 14 combines the coded extended background image, the coded extraction parameters, the coded defocus value, and the coded foreground picture according to the predetermined syntax, thereby producing a code stream. This code stream is transmitted to the decoder side.

Figure 4:
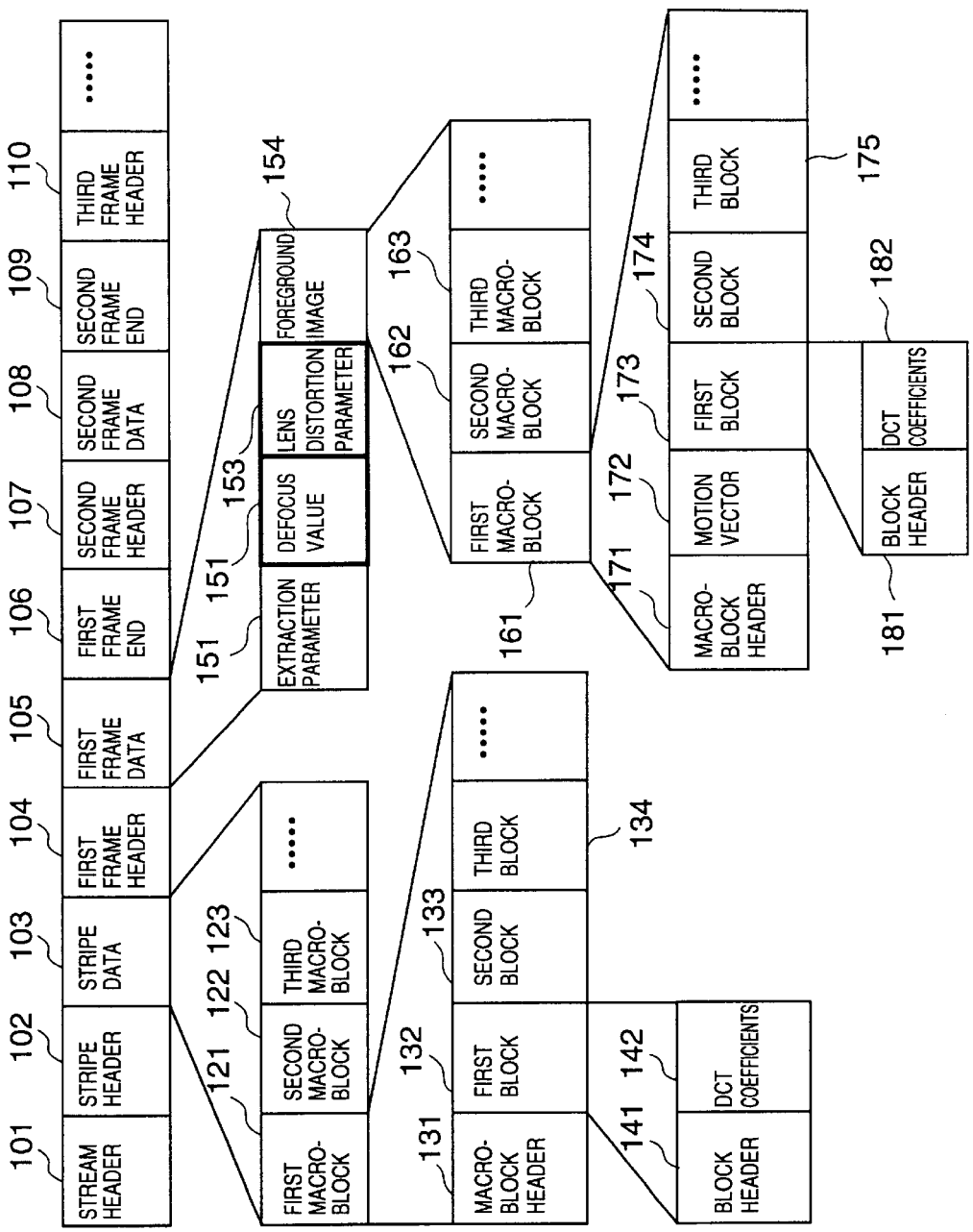
FIG. 4 is an example of a code stream according to the embodiment of the present invention.

FIG. 4 is an example of a code stream according to the embodiment of the present invention. The code stream illustrated in FIG. 4 is provided by way of example, and is not intended as limiting the present invention.

A code stream generated by the stream generation unit 14 includes a stream header 101, a sprite header 102, sprite data 103, a first frame header 104, first frame data 105, a first frame end 106, a second frame header 107, second frame data 108, a second frame end 109, a third frame header 110, and so on. The stream header 101 includes header information that defines the entire code stream. The sprite header 102 includes header information that defines the extended background image of the code stream. The frame headers 104, 107, 110, and so on include header information that defines a corresponding frame of the code stream.

The sprite data 103 includes a first macro-block 121, a second macro-block 122, a third macro-block 123, and so on. Each macro-block is comprised of a macro-block header and a plurality of associated blocks. For example, the first macro-block 121 includes a macro-block header 131, a first block 132, a second block 133, a third block 134, and so on. In this manner, the extended background image of the sprite data 103 is divided into a plurality of macro-blocks, each of which is further divided into a plurality of blocks. Each block is comprised of a block header and associated DCT coefficients, for example, if the DCT (discrete cosine transform) is employed as a data coding scheme by the extended background image coding unit 15. For example, the first block 132 includes a block header 141 and DCT coefficients 142 that are obtained by applying DCT to the corresponding block image.

The first frame data 105 includes extraction parameters 151, a defocus value 152, lens distortion parameters 153, and a foreground image 154. The same data structure applies in the case of other frame data, so that the second frame data 108, for example, includes the same set of data as the first frame data 105 as described here. The extraction parameters 151 define an image patch that is to be extracted from the extended background image so as to be used as a background picture at the receiver end (i.e., on the decoder side). The defocus value 152 defines the extent to which the image patch to be extracted from the extended background image is to be defocused. The lens distortion parameters 153 represent the extent to which the image patch to be extracted from the extended background image is to be distorted according to the lens distortion of the recording camera system, which will be described later in detail.

The foreground image 154 includes a first macro-block 161, a second macro-block 162, a third macro-block 163, and so on. Each macro-block is comprised of a macro-block header, motion vectors, and a plurality of associated blocks. For example, the first macro-block 161 includes a macro-block header 171, motion vectors 172, a first block 173, a second block 174, a third block 175, and so on. In this manner, the foreground image 154 is divided into a plurality of macro-blocks, each of which is further divided into a plurality of blocks. Each block is comprised of a block header and associated DCT coefficients, for example, if the DCT (discrete cosine transform) is employed as a data coding scheme by the foreground picture coding unit 13. For example, the first block 173 includes a block header 181 and DCT coefficients 182 that are obtained by applying DCT to the corresponding block image.

Figure 5:
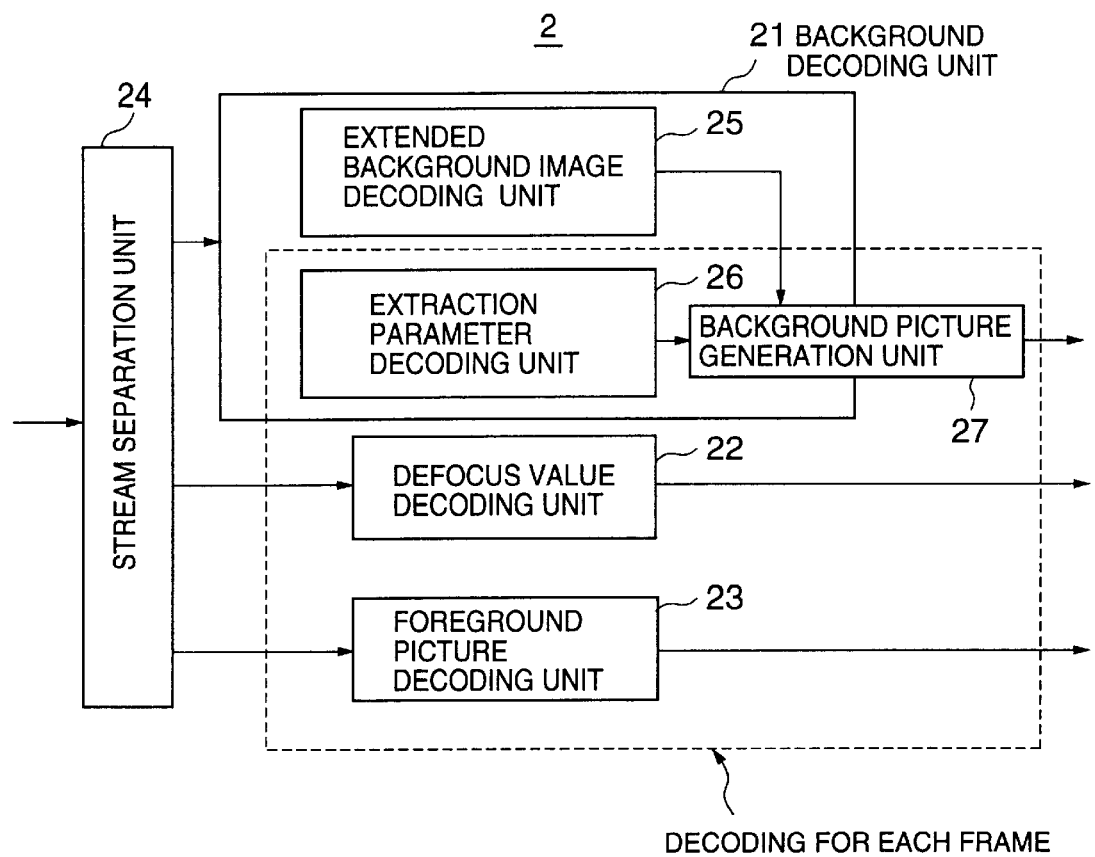
FIG. 5 is a block diagram of a decoder circuit according to the first embodiment of the present invention.

FIG. 5 is a block diagram of the decoder circuit 2 according to the first embodiment of the present invention.

The decoder circuit 2 of FIG. 5 includes a background decoding unit 21, a defocus value decoding unit 22, a foreground picture decoding unit 23, and a stream separation unit 24. The background decoding unit 21 includes an extended background image decoding unit 25, an extraction parameter decoding unit 26, and a background picture generation unit 27.

The stream separation unit 24 receives the code stream as shown in FIG. 4 from the stream generation unit 14, and separates the coded extended background image, the coded extraction parameters, the coded defocus value, and the coded foreground picture according to the predetermined syntax.

The background decoding unit 21 decodes background related information. To be specific, the extended background image decoding unit 25 of the background decoding unit 21 decodes the extended panoramic image for background pictures, and supplies the decoded extended background image to the background picture generation unit 27. The extended background image decoding unit 25 is a decoder that operates based on the intra-coding/decoding scheme defined in MPEG-4, and is well within the skill of a person having ordinary skill in the art.

The extraction parameter decoding unit 26 of the background decoding unit 21 decodes the coded extraction parameters supplied from the stream separation unit 24, and provides the decoded extraction parameters to the background picture generation unit 27. Decoding of the extraction parameters by the extraction parameter decoding unit 26 is defined in MPEG-4.

The background picture generation unit 27 of the background decoding unit 21 receives the decoded extended background image from the extended background image decoding unit 25 and the decoded extraction parameters from the extraction parameter decoding unit 26. The background picture generation unit 27 extracts an image patch from the extended background image according to the extraction parameters, and outputs the extracted image as a background picture.

The defocus value decoding unit 22 decodes the defocus value, and outputs the decoded defocus value. As shown in the code stream of FIG. 4, a frame-specific defocus value is provided with respect to each frame. That is, the extent of image blurring is defined by the defocus value for each image frame on the frame-specific basis.

The foreground picture decoding unit 23 decodes one or more foreground pictures, which are to be composed with the background picture at the receiver end. The foreground pictures are decoded as defined by MPEG-4.

Figure 6:
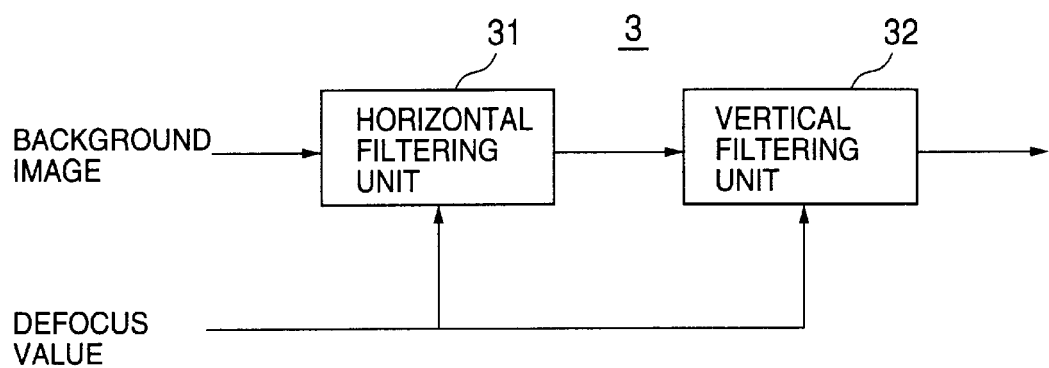
FIG. 6 is a block diagram of a defocus circuit according to the present invention.

FIG. 6 is a block diagram of the defocus circuit 3 according to the present invention.

The defocus circuit 3 of FIG. 6 includes a horizontal filtering unit 31 and a vertical filtering unit 32. The horizontal filtering unit 31 is a digital filter that is configured to apply a filtering operation to each background picture in the horizontal direction. The vertical filtering unit 32 is a digital filter that is configured to apply a filtering operation to each background picture in the vertical direction. In this example, the filtering process is performed in the horizontal direction and in the vertical direction separately by using the respective filters. Alternatively, the filtering process may be applied in a two-dimensional fashion by use of a two dimensional filter, and the specifics of the filter configuration is a matter of a design choice.

The filtering operation is performed for the purpose of defocusing (i.e., blurring) the background picture in accordance with the defocus value.

Figure 7:
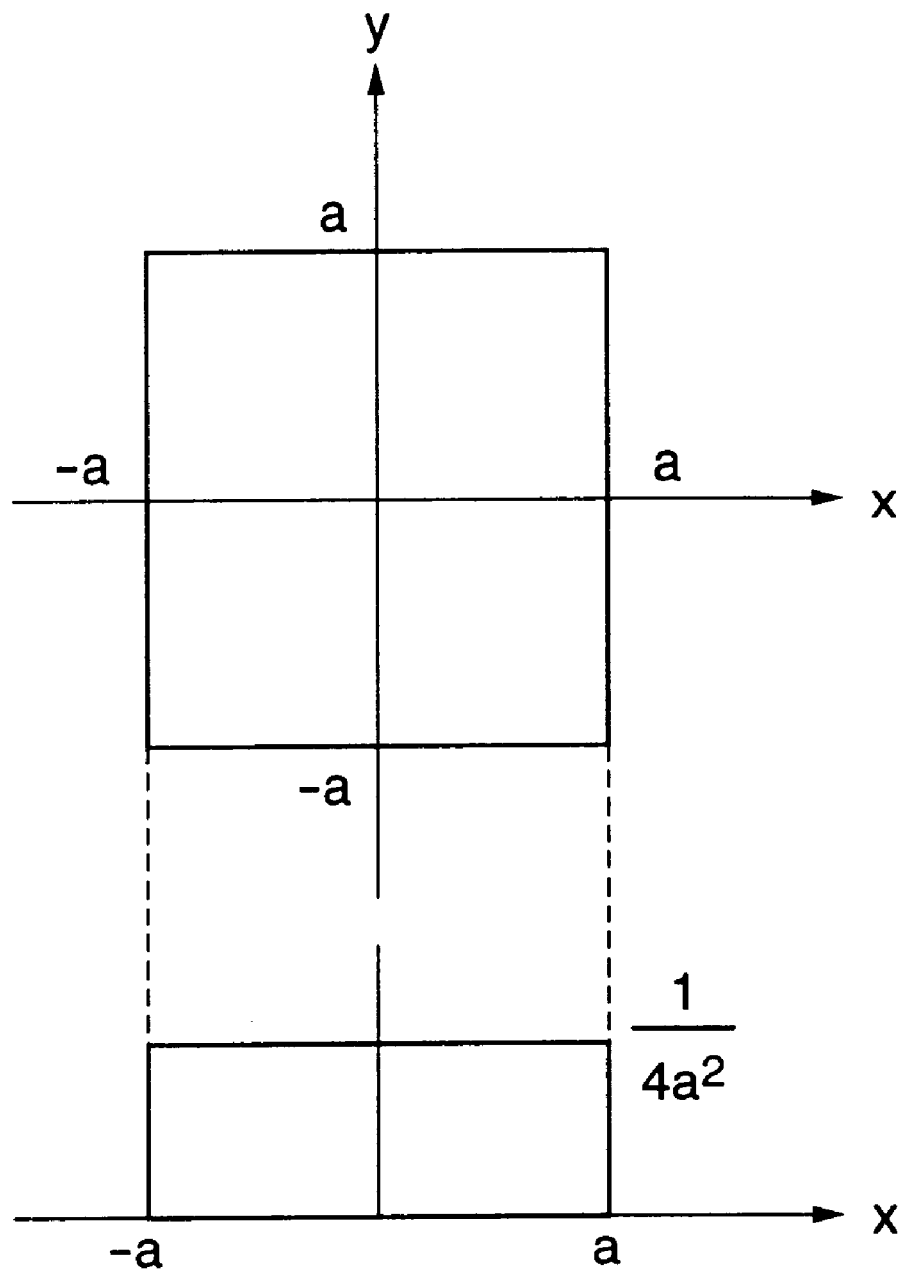
FIG. 7 is an illustrative drawing showing an impulse response of a defocus filter that is applied according to the embodiment of the present invention.

FIG. 7 is an illustrative drawing showing a configuration of a defocus filter that is applied according to the embodiment of the present invention.

The defocus filter of FIG. 7 is a square-shaped filter P(x, y) that is represented as:

$$P(x, y) = \tfrac{1}{4}a^2 \text{ if } |x| \leq a, |y| \leq a, \text{ and } 0 \text{ else,} \qquad (2)$$

where the value "a" is the defocus value used as a defocusing control parameter. The greater the defocus value "a", the more blurred the resulting image is. The value "¼a²" is a standardizing parameter to keep the intensity of the filtered image consistent with the intensity of the original image. In order to implement the square-shaped filter P(x, y), the horizontal filtering unit 31 may have a configuration represented as:

$$Px(x) = \tfrac{1}{2}a \text{ if } |x| \leq a, \text{ and } 0 \text{ else,} \qquad (3)$$

and the vertical filtering unit 32 may have a configuration represented as:

$$Py(y) = \tfrac{1}{2}a \text{ if } |y| \leq a, \text{ and } 0 \text{ else.} \qquad (4)$$

In the practical implementation, if the digital-filter taps of the horizontal filtering unit 31 or the vertical filtering unit 32 lie outside the image, outer pixels may be obtained by the padding process that pads the padding data in the outside pixels. Actual implementation of the filtering process by use of a digital filter is well within the skill of a person having ordinary skill in the art.

An optical system of a video camera, which is used for recoding video images, has a point spread function. The point spread function when the image is out of focus is typically defined as a round shape, so that a circular-shaped filter should produce substantially the same defocusing effect as would be produced by the optical system. The square-shaped filter P(x, y) as described above is different from such a circular-shaped filter, but has an advantage in that it is easier to implement than the circular-shaped filter since the circular-shaped digital filter requires a large number of filter taps. If use of the square-shaped filter produces undesirable artifacts such as moiré, and suppression of such artifacts are desired, further filtering process such as application of another square-shaped filter slanted at a 45-degree angle may be performed so as to approximate for a round shape point spread function.

In the manner as described above, the defocus circuit 3 uses the horizontal filtering unit 31 and the vertical filtering unit 32 to defocus the background picture in accordance with the defocus value that is supplied from the coder side, thereby producing a defocused background image that should appear natural when composed with foreground images. The defocused background picture is supplied from the vertical filtering unit 32 to the synthesizing circuit 4, which composes the defocused background picture with one or more foreground pictures in the manner as defined by the MPEG-4 standard.

Figure 8:
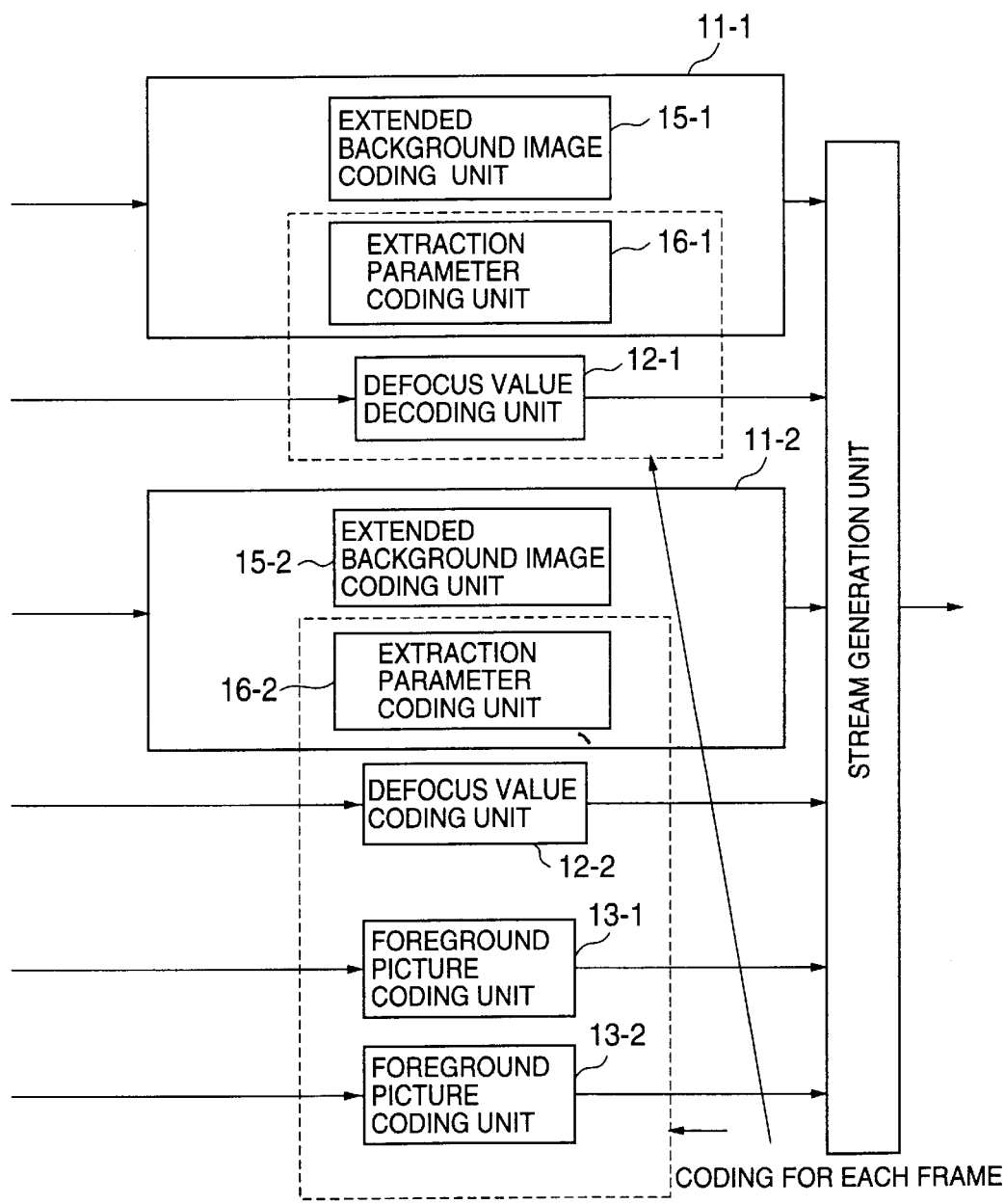
FIG. 8 is a block diagram of a coder circuit according to another embodiment of the present invention.

FIG. 8 is a block diagram of the coder circuit according to another embodiment of the present invention.

The coder circuit of FIG. 8 is directed to a situation in which a plurality of extended background images and a plurality of foreground pictures are used. In the example of FIG. 8, the number of extended background images is two, and so is the number of foreground pictures.

There may be cases in which it is desirable to switch extended background images, depending on the context of broadcast, for example. Either one of the extended background images is selected at a time. The coder circuit of FIG. 8 is provided with two background coding units 11-1 and 11-2 to cope with use of two different extended background images. The background coding unit 11-1 includes an extended background image coding unit 15-1 and an extraction parameter coding unit 16-1, and the background coding unit 11-2 includes an extended background image coding unit 15-2 and an extraction parameter coding unit 16-2. Further, a defocus value coding unit 12-1 and a defocus value coding unit 12-2 are provided for the purpose of coding and transmitting two defocus values corresponding to the respective extended background images.

Further, there may be cases in which more than one foreground pictures need to be presented. The coder circuit of FIG. 8 includes two foreground picture coding units 13-1 and 13-2 for coding two respective foreground pictures.

Figure 9:
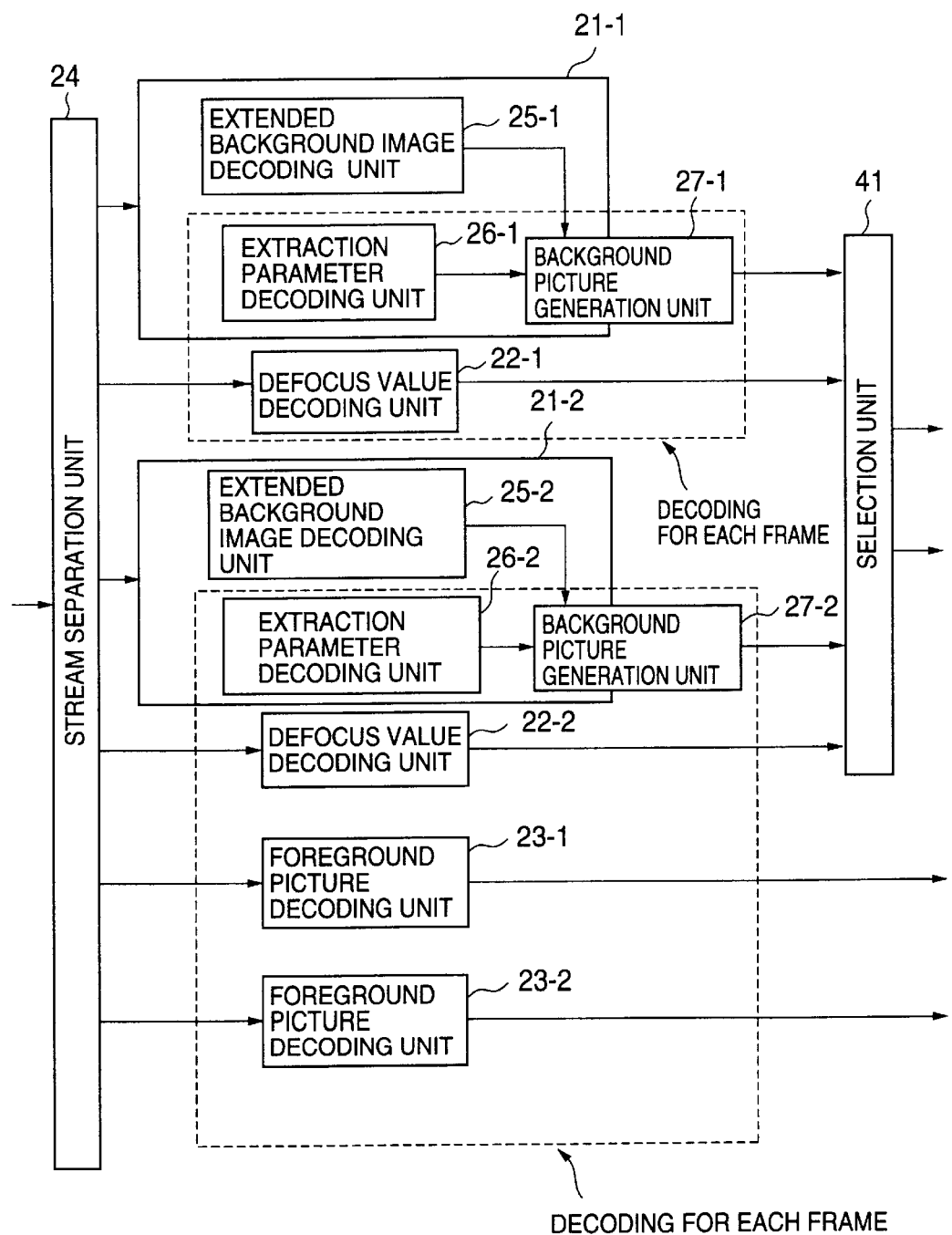
FIG. 9 is a block diagram of a decoder circuit that is used together with the coder circuit of FIG. 8.

FIG. 9 is a block diagram of a decoder circuit that is used together with the coder circuit of FIG. 8. In FIG. 9, the same elements as those of FIG. 5 will be referred to by the same reference numerals, and a description thereof will be omitted.

The decoder circuit of FIG. 9 is directed to a situation in which a plurality of extended background images and a plurality of foreground pictures are used as in the embodiment shown in FIG. 8. The decoder circuit of FIG. 9 includes a background decoding unit 21-1 and a background decoding unit 21-2, which correspond to the two respective extended background images. Further, defocus value decoding units 22-1 and 22-2 are provided for the purpose of coping with the two respective extended background images. The background decoding unit 21-1 includes an extended background image decoding unit 25-1, an extraction parameter decoding unit 26-1, and a background picture generation unit 27-1. The background decoding unit 21-2 includes an extended background image decoding unit 25-2, an extraction parameter decoding unit 26-2, and a background picture generation unit 27-2. Further, the decoder circuit of FIG. 9 includes two foreground picture decoding units 23-1 and 23-2 for decoding two respective foreground pictures.

A selection unit 41 is further provided in the decoder circuit of FIG. 9, and is used to select one of the decoded background pictures supplied from the background picture generation units 27-1 and 27-2. The selection unit 41 also selects a corresponding one of the defocus values supplied from the defocus value decoding units 22-1 and 22-2. The selected one of the background pictures is supplied to the defocus circuit 3, which applies defocusing processing according to the selected one of the defocus values.

In the manner described above, the coder-&-decoder configuration of FIG. 8 and FIG. 9 makes it possible to handle a plurality of extended background images and a plurality of foreground pictures. Although this configuration is configured to provide two background pictures and two foreground pictures, the present invention is not limited to this particular number, and can be applicable to use of three or more pictures. It should be noted that the number of background pictures and the number of foreground pictures may be different from and independent of each other.

In the case of a plurality of extended background images and a plurality of foreground pictures, the code stream as shown in FIG. 4 may include the sprite data for the plurality of extended background images, and may include the foreground image for the plurality of foreground pictures. Further, the code stream may include an additional parameter that defines which one of the background pictures is used, and the selection of the background pictures by the selection unit 41 may be made based on this parameter accordingly.

In the following, a scheme that suppresses unrealistic appearance of reconstructed images caused by disparity between the presence and absence of lens distortion will be described.

FIG. 10 is a block diagram showing a decoder and encoder apparatus according a second embodiment of the present invention.

The decoder and encoder apparatus of FIG. 10 includes a lens distortion compensation circuit 51, an extended background image generation circuit 52, a coder circuit 53, a decoder circuit 54, a background picture separation unit 55, and a lens distortion adding unit 56. The configuration of FIG. 10 is solely directed to the coding and decoding of background images. Although the coding and decoding of foreground images associated therewith is not shown for the sake of simplicity of explanation, such operation is performed in the same manner as was described in connection with FIG. 1 through FIG. 9.

Figure 11A:
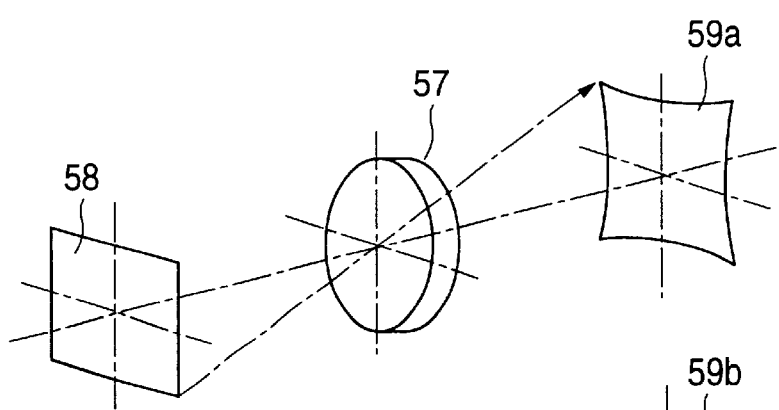
FIGS. 11A and 11B are illustrative drawings showing examples of lens distortions.
Figure 11B:
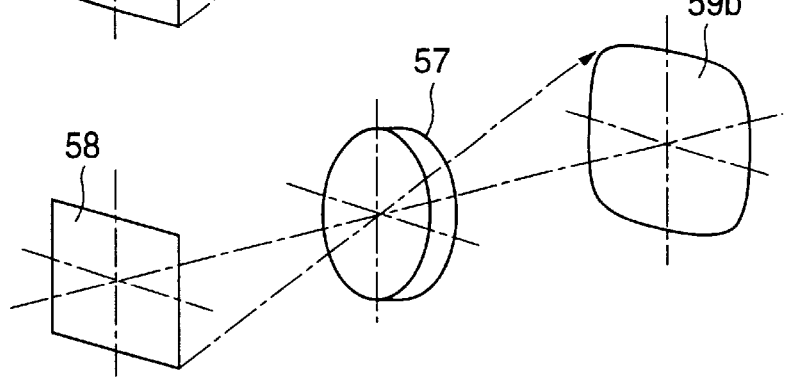

The lens distortion compensation circuit 51 processes each frame of a video signal A in accordance with a camera lens distortion signal B so as to compensate for lens distortion. FIGS. 11A and 11B are illustrative drawings showing examples of lens distortions. As shown in FIGS. 11A and 11B, when a square object 58 is taken picture of by use of a lens 57, distorted images 59a and 59b will be produced. A pincushion distortion as exhibited by the image 59a is called a positive distortion, and a barrel distortion as exhibited by the image 59b is called a negative distortion.

As is known, lens distortion can be compensated for in respect of image-screen coordinates by the following procedure, for example.

Coordinates (Xd, Yd) are those of an image having lens distortion, and coordinates (Xu, Yu) are those of an image having the lens distortion thereof compensated for. These coordinates are related as:

$Xu = Xd + Dx$ $Yu = Yd + Dy,$ (5)

where Dx and Dy are distortions in the radial direction of the lens, and are represented as follows by use of distortion factors $k_1$ and $k_2$.

$Dx = Xd(k_1 r^2 + k_2 r^4)$ $Dy = Yd(k_1 r_2 + k_2 r^4)$ $r = (Xd^2 + Yd^2)^{1/2}$ (6)

In the above formula, $k_2$ is often approximated to zero. With respect to the compensated coordinates, luminance and chrominance signal levels are obtained from surrounding pixels by interpolation, thereby producing a video signal C having the lens distortion thereof compensated for.

The extended background image generation circuit 52 integrates together a plurality of frame images of the lens-distortion-compensated video signal C while properly positioning them relative to each other, thereby producing a single composite image. Relative positions of these images are determined based on a camera parameter signal D that may represent camera panning and zooming or the like, which may be estimated from the video signal A or directly measured from the camera position sensor. Based on this, an extended background image signal E is output, representing a still image integrating all the frame images together.

The coder circuit 53 encodes a lens-distortion signal B, the camera parameter signal D, and the extended background image signal E, thereby producing a digital data signal F. The decoder circuit 54 decodes the coded digital data signal F so as to produce a decoded extended background image signal G, a decoded camera parameter signal H, and a decoded lens-distortion signal I. The background picture separation unit 55 uses the decoded camera parameter signal H to extract an image of each video frame from the decoded extended background image signal G in the manner reverse to that performed by the extended background image generation circuit 52. As a result, a decoded video image signal J is produced.

The lens distortion adding unit 56 processes the decoded video image signal J according to the decoded lens-distortion signal I, so as to add lens distortion to an image of each video frame in the manner reverse to that performed by the lens distortion compensation circuit 51. Namely, the lens distortion is added back, thereby producing a video signal K.

According to the second embodiment of the present invention, lack of lens distortion is taken into consideration and compensated for at the time of image decoding, so that a composed image of the background picture and the foreground picture is obtained, with no or little unrealistic appearance.

Figure 12:
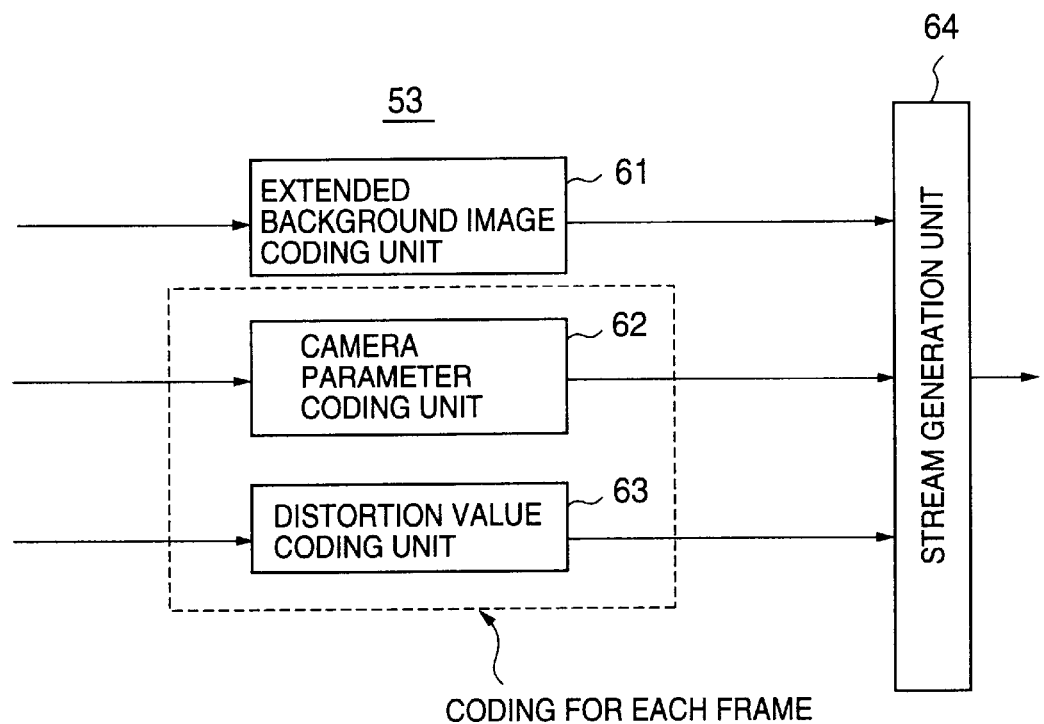
FIG. 12 is a block diagram of a coder circuit according to the second embodiment of the present invention.

FIG. 12 is a block diagram of the coder circuit 53 according to the second embodiment of the present invention.

The coder circuit 53 of FIG. 12 includes an extended background image coding unit 61, a camera parameter coding unit 62, a distortion value coding unit 63, and a stream generation unit 64.

The extended background image coding unit 61 encodes an extended panoramic image for background pictures, and supplies the coded extended background image to the stream generation unit 64. The extended background image coding unit 61 is an encoder that operates based on the intra-coding scheme defined in MPEG-4, and is well within the skill of a person having ordinary skill in the art.

Coding of the extended background image is attended only once prior to coding and transmitting of foreground pictures. Once the extended background image is coded and transmitted, the receiver side (decoder side) can extract an image patch from the decoded extended background image to use it as the background picture of the video. To this end, camera parameters for extraction of the image patch are coded by the camera parameter coding unit 62 with respect to each video frame, and are supplied to the stream generation unit 64 after coding. Coding of the camera parameters by the camera parameter coding unit 62 is defined in MPEG-4. It should be noted that these camera parameters are the same or at least functionally the same as the extraction parameters described in connection with the first embodiment.

The distortion value coding unit 63 encodes the distortion value, and supplies the corresponding codes to the stream generation unit 64. Determination of a proper distortion value should be made with respect to each image frame.

FIG. 13 shows an example of a table that specifies lens distortion in relation to the camera mechanics. As shown in FIG. 13, lens distortion parameters such as $k_1$ and $k_2$ vary depending on the current camera settings such as the focus setting, the zoom setting, and the focal length. Namely, the lens distortion exhibits changes as the camera settings are changed from video frame to video frame at the time of video recording. Further, the coordinates of the image center also exhibit small displacements depending on the camera settings. These lens distortion parameters $k_1$, $k_2$, the image center horizontal coordinate, and the image center vertical coordinate may be used as the distortion value, which is coded by the distortion value coding unit 63, and will be used to add the lens distortion back to the extracted background picture at the decoder end by use of the equation (6) described above.

The distortion value (i.e., the distortion parameters) is a set of numeric values, and, thus, is simply encoded into a set of a plurality of bits, which may be transmitted without any data compression.

The stream generation unit 64 combines the coded extended background image, the coded extraction parameters (i.e., coded camera parameters), and the coded distortion value according to the predetermined syntax, thereby producing a code stream. In reality, this code stream, when transmitted to the decoder side, includes coded foreground pictures as shown in the example of FIG. 4.

Figure 14:
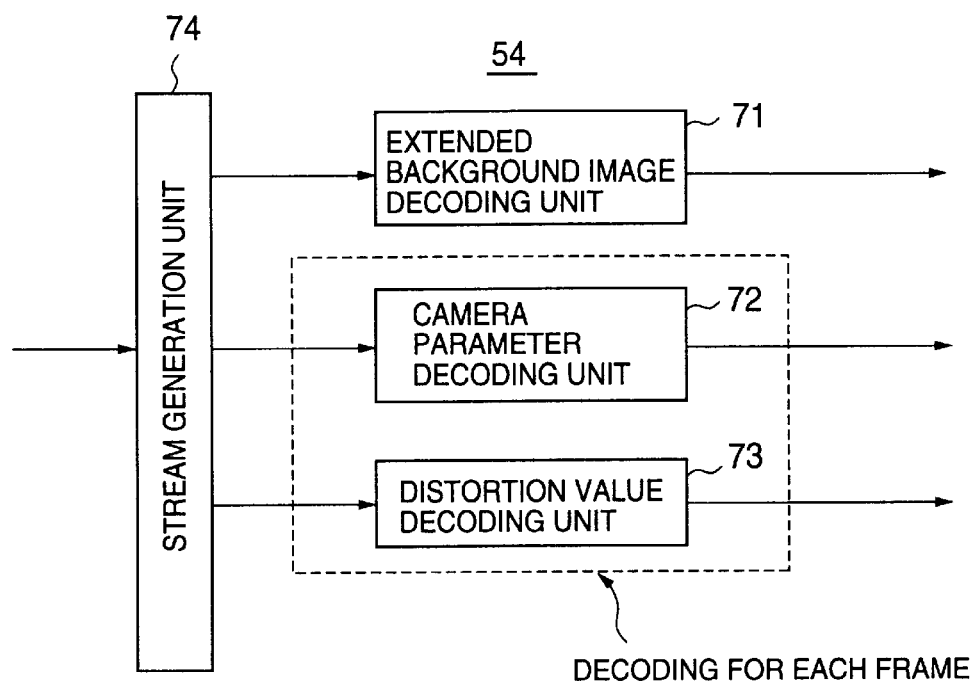
FIG. 14 is a block diagram of a decoder circuit according to the second embodiment of the present invention.

FIG. 14 is a block diagram of the decoder circuit 54 according to the second embodiment of the present invention.

The decoder circuit 54 of FIG. 14 includes an extended background image decoding unit 71, a camera parameter decoding unit 72, a distortion value decoding unit 73, and a stream generation unit 74.

The stream separation unit 74 receives the code stream as shown in FIG. 4 from the stream generation unit 64, and separates the coded extended background image, the coded camera parameters, and the coded distortion value according to the predetermined syntax. The coded foreground pictures are also separated in the same manner as in the first embodiment, although not shown in FIG. 14 for the sake of simplicity of explanation.

The extended background image decoding unit 71 decodes the extended panoramic image for background pictures, and outputs the decoded extended background image. The extended background image decoding unit 71 is a decoder that operates based on the intra-coding/decoding scheme defined in MPEG-4, and is well within the skill of a person having ordinary skill in the art.

The camera parameter decoding unit 72 decodes the coded camera parameters supplied from the stream separation unit 74, and provides the decoded camera parameters. Decoding of the camera parameters by the camera parameter decoding unit 72 is defined in MPEG-4.

The distortion value decoding unit 73 decodes the distortion value, which may be comprised of lens distortion parameters $k_1$, $k_2$, the image center horizontal coordinate, and the image center vertical coordinate as previously described, for example. The distortion value decoding unit 73 outputs the decoded distortion value, and supplies it to the lens distortion adding unit 56.

As shown in the code stream of FIG. 4, the distortion value is specific to each frame, and is provided separately with respect to each frame. That is, the extent of lens distortion is defined by the distortion value for each image frame on the frame-specific basis.

Based on the decoded distortion value, the lens distortion adding unit 56 adds frame-specific lens distortion to a corresponding frame image. The process of adding the lens distortion is carried out by using the inverse transformation of the equation (6) so as to obtain the coordinates (Xd, Yd) having lens distortion from the coordinates (Xu, Yu) free of lens distortion. Since the coordinates of the image center fluctuate with the camera settings as shown in FIG. 13, the displacement of the center coordinates is taken into consideration when computing the equation (6) at the coder end as well as when computing the inverse of the equation (6) at the decoder end.

The embodiments described above have been provided by way of example. The control of defocusing of the background picture based on the coding and decoding of a defocus value may be implemented together with the control of lens distortion of the background picture based on the coding and decoding of the distortion value. Alternatively, only either one of the control of defocusing and the control of lens distortion may be implemented without use of the other. Further, the configuration designed for use of a plurality of background images and a plurality of foreground images may as well be applied together with the control of lens distortion, and is not limited to the specific structure described in connection with FIG. 8 and FIG. 9.

The present invention is not limited to these embodiments, but variations and modifications may be made without departing from the scope of the present invention.

The present application is based on Japanese priority applications No. 2000-78131 filed on Mar. 21, 2000 and No. 2000-203335 filed on Jul. 5, 2000, with the Japanese Patent Office, the entire contents of which are hereby incorporated by reference.

What is claimed is:

1. A method of coding and transmitting moving pictures, comprising the steps of:

coding an extended background image;

coding parameters indicative of an image area within the extended background image;

coding a foreground picture that is to be composed with a background picture corresponding to the image area indicated by the parameters;

coding a defocus value indicative of an extent to which the background picture should blur; and transmitting the coded extended background image, the coded parameters, the coded foreground picture, and the coded defocus value as a data stream to a decoder side.

2. The method as claimed in claim 1, further comprising a step of obtaining the defocus value from camera parameters used to take the foreground picture and a distance from a camera to a background object.

3. The method as claimed in claim 1, wherein the defocus value is camera parameters used to take the foreground picture and a distance from a camera to a background object.

4. The method as claimed in claim 1, further comprising the steps of:

coding an additional extended background image;

coding additional parameters indicative of an image area within the additional extended background image; and coding an additional defocus value indicative of an extent to which a background picture corresponding to the image area within the additional extended background image should blur, wherein said step of transmitting transmits the coded additional extended background image, the coded additional parameters, and the coded additional defocus value to the decoder side as part of said data stream.

5. A method of decoding moving pictures, comprising the steps of:

decoding an extended background image;

decoding parameters indicative of an image area within the extended background image;

extracting a background picture from the image area indicated by the decoded parameters within the decoded extended background image;

decoding a foreground picture;

decoding a defocus value indicative of an extent to which the background picture should blur;

blurring the background picture to the extent indicated by the decoded defocus value; and combining the blurred background picture with the decoded foreground picture.

6. The method as claimed in claim 5, wherein the defocus value is camera parameters used to take the foreground picture and a distance from a camera to a background object.

7. The method as claimed in claim 5, further comprising:

decoding an additional extended background image;

decoding additional parameters indicative of an image area within the additional extended background image;

extracting an additional background picture from the image area indicated by the additional parameters within the decoded additional extended background image;

decoding an additional defocus value indicative of an extent to which the additional background picture should blur;

selecting either one of the background picture and the additional background picture to be composed with the decoded foreground picture; and selecting either one of the defocus value and the additional defocus value to be used to blur the selected one of the background picture and the additional background picture.

8. A method of coding and decoding moving pictures, comprising the steps of:

coding an extended background image and a foreground picture separately from each other;

coding parameters indicative of an image area within the extended background image;

coding a defocus value;

decoding the extended background image and the foreground picture;

decoding the parameters;

decoding the defocus value;

extracting a background picture from the image area indicated by the decoded parameters within the decoded extended background image;

blurring the background picture to an extent indicated by the decoded defocus value; and composing the blurred background picture with the decoded foreground picture.

9. An apparatus for coding moving pictures, comprising:

a coding unit which encodes an extended background image;

a coding unit which encodes parameters indicative of an image area within the extended background image;

a coding unit which encodes a foreground picture that is to be composed with a background picture corresponding to the image area indicated by the parameters;

a coding unit which encodes a defocus value indicative of an extent to which the background picture should blur; and a stream generation unit which transmits the coded extended background image, the coded parameters, the coded foreground picture, and the coded defocus value as a data stream.

10. An apparatus for decoding moving pictures, comprising:

a decoding unit which decodes an extended background image;

a decoding unit which decodes parameters indicative of an image area within the extended background image;

a background picture generation unit which extracts a background picture from the image area indicated by the decoded parameters within the decoded extended background image;

a decoding unit which decodes a foreground picture;

a decoding unit which decodes a defocus value indicative of an extent to which the background picture should blur;

a defocus unit which blurs the background picture to the extent indicated by the decoded defocus value; and a synthesizing unit which composes the blurred background picture with the decoded foreground picture.

11. A method of coding and transmitting moving pictures, comprising the steps of:

coding an extended background image;

coding parameters indicative of an image area within the extended background image;

coding a foreground picture that is to be composed with a background picture corresponding to the image area indicated by the parameters;

coding a distortion value indicative of an extent to which the background picture should be distorted due to lens distortion; and transmitting the coded extended background image, the coded parameters, the coded foreground picture, and the coded distortion value as a data stream to a decoder side.

12. A method of decoding moving pictures, comprising the steps of:

decoding an extended background image;

decoding parameters indicative of an image area within the extended background image;

extracting a background picture from the image area indicated by the decoded parameters within the decoded extended background image;

decoding a foreground picture;

decoding a distortion value indicative of an extent to which the background picture should be distorted due to lens distortion;

distorting the background picture to the extent indicated by the decoded distortion value; and composing the distorted background picture with the decoded foreground picture.

13. A method of coding and decoding moving pictures, comprising the steps of:

coding an extended background image and a foreground picture separately from each other;

coding parameters indicative of an image area within the extended background image;

coding a distortion value;

decoding the extended background image and the foreground picture;

decoding the parameters;

decoding the distortion value;

extracting a background picture from the image area indicated by the decoded parameters within the decoded extended background image;

distorting the background picture to an extent indicated by the decoded distortion value; and composing the distorted background picture with the decoded foreground picture.

14. An apparatus for coding moving pictures, comprising:

a coding unit which encodes an extended background image;

a coding unit which encodes parameters indicative of an image area within the extended background image;

a coding unit which encodes a foreground picture that is to be composed with a background picture corresponding to the image area indicated by the parameters;

a coding unit which encodes a distortion value indicative of an extent to which the background picture should be distorted due to lens distortion; and a stream generation unit which transmits the coded extended background image, the coded parameters, the coded foreground picture, and the coded distortion value as a data stream.

15. An apparatus for decoding moving pictures, comprising:

a decoding unit which decodes an extended background image;

a decoding unit which decodes parameters indicative of an image area within the extended background image;

a background picture generation unit which extracts a background picture from the image area indicated by the decoded parameters within the decoded extended background image;

a decoding unit which decodes a foreground picture;

a decoding unit which decodes a distortion value indicative of an extent to which the background picture should be distorted due to lens distortion;

a distortion unit which distorts the background picture to the extent indicated by the decoded distortion value; and a synthesizing unit which composes the distorted background picture with the decoded foreground picture.

* * * * *